United States Patent [19]

Watanabe et al.

[11] Patent Number: 4,704,372

[45] Date of Patent: Nov. 3, 1987

[54] HIGH-STRENGTH MOLYBDENUM SILICIDE-BASED CERAMIC MATERIAL AND PROCESS FOR PRODUCING THE SAME

[75] Inventors: Tadahiko Watanabe; Kazuhisa Shobu, both of Tosu, Japan

[73] Assignee: Agency of Industrial Science and Technology, Tokyo, Japan

[21] Appl. No.: 712,184

[22] Filed: Mar. 15, 1985

[30] Foreign Application Priority Data

Mar. 16, 1984 [JP] Japan .................................. 59-51882
Apr. 14, 1984 [JP] Japan .................................. 59-75641

[51] Int. Cl.$^4$ ...................... C04B 35/52; C04B 35/58
[52] U.S. Cl. ........................................ 501/87; 501/96; 264/65; 264/60
[58] Field of Search ...................... 501/96, 87; 264/65, 264/60

[56] References Cited

U.S. PATENT DOCUMENTS

| | | | |
|---|---|---|---|
| 3,189,477 | 6/1965 | Shaffer | 501/96 |
| 3,251,698 | 5/1966 | Colton | 501/96 |
| 3,958,070 | 5/1976 | Schintimeister et al. | 428/209 |
| 4,379,852 | 4/1983 | Watanabe et al. | 501/87 |
| 4,492,764 | 1/1985 | Watanabe et al. | 501/96 |

FOREIGN PATENT DOCUMENTS 59-13671  1/1984  Japan ..................................... 501/96

Primary Examiner—William R. Dixon, Jr.
Assistant Examiner—A. Knab
Attorney, Agent, or Firm—Oblon, Fisher, Spivak, McClelland & Maier

[57] ABSTRACT

This invention relates to a high-strength molybdenum silicide-based ceramic material and a process for producing such ceramic material. A powder mixture obtained by adding to titanium carbonitride 0–100% by weight of a specific metal boride compound is added to powder of molybdenum silicide used as base component, and the obtained mixed powder composition is sintered. Both strength and density of molybdenum silicide are increased while maintaining its low-temperature sinterability.

6 Claims, No Drawings

HIGH-STRENGTH MOLYBDENUM SILICIDE-BASED CERAMIC MATERIAL AND PROCESS FOR PRODUCING THE SAME

TECHNICAL FIELD OF THE INVENTION

This invention relates to a novel high-strength molybdenum silicide-based ceramic material and a process for producing such ceramic material. More particularly, it relates to a high-strength ceramic material obtained by sintering a mixed powder composition comprising powder of molybdenum silicide as base component and a mixture of titanium carbonitride and 0–100% by weight of a specific metal boride compound, and a process for producing such ceramic material.

DESCRIPTION OF PRIOR ART

Molybdenum silicide $MoSi_2$ is relatively high in melting point and also excellent in corrosion and oxidation resistance, and its advantageous use as a high-temperature structural material is expected. However, the sintered body of $MoSi_2$ alone is low in strength and also extremly brittle at normal temperature, so that the industrial use thereof has been limited to electrical resistance heating elements.

SUMMARY OF THE INVENTION

In the course of the study conducted for removing such defect, the present inventors found that the sintered body of a mixed powder composition prepared by adding to powder of molybdenum silicide a specified amount of titanium carbonitride powder or further adding thereto a given amount of a specific metal boride compound has a high density and is also high in strength, and the present invention was achieved based on such finding.

Titanium carbonitride is generally high in melting point, hardness and toughness and also excellent in oxidation resistance, but its sintered body is low in flexural strength and brittle and is therefore scarcely utilized for industrial applications. Also, said metal boride compounds have high melting point, high hardness and excellent high-temperature strength, but the sintered body thereof, like that of said titanium carbonitride, is low in flexural strength and brittle.

The high-strength molybdenum silicide-based ceramic material provided according to this invention maintains the characteristic low-temperature sinterability of molybdenum silicide and is also enhanced in density and strength and further improved in brittleness by the incorporation of said titanium carbonitride and/or a metal boride compound.

Thus, according to this invention, there is provided a high-strength molybdenum silicide-based ceramic material and a process for producing such ceramic material comprising using powder of molybdenum silicide as base component, adding thereto, in an amount of 1–99% by weight, a powder mixture obtained by adding to titanium carbonitride powder at least one powdered metal boride compound selected from the group consisting of $TiB_2$, $CrB_2$, $TaB_2$, $MnB_2$, $MgB_2$, $MoB_2$, $VB_2$, $NbB_2$, $HfB_2$, $AlB_2$, $W_2B_5$ and $Mo_2B_5$ in amount of 0–100% by weight, and sintering the resulting mixed powder composition. The present invention also provides a method for producing a high-strength molybdenum silicide-based ceramic material characterized by sintering said powder composition in vacuo or in a neutral or reducing atmosphere by hot press, or by subjecting said composition to cold compression and made into a powder compact by rubber press or by slurry method and then sintering such powder compact in vacuo or in a neutral or reducing atmosphere.

In the process of this invention, molybdenum silicide $MoSi_2$ is used in the form of powder and preferably prepared into fine powder with an average particle size of 2 microns or less.

Titanium carbonitride $Ti(C\alpha N\beta)$ used in this invention is preferably of the type in which the $\alpha:\beta$ ratio is in the range of 10:90 to 90:10. Such titanium carbonitride compounds can be used either singly or in combination. Also, said titanium carbonitride is used in a powdery form, preferably prepared into fine powder with an average particle size of 2 microns or less.

The metal boride compound usable in this invention include the metal diboride compounds and metal pentaboride compounds represented by $MB_2$ and $M_2B_5$ (M representing metal), respectively. $TiB_2$, $CrB_2$, $TaB_2$, $MnB_2$, $MgB_2$, $MoB_2$, $AlB_2$, $VB_2$, $NbB_2$ and $HfB_2$ can be used and $MB_2$ type compounds and $W_2B_5$ and $Mo_2B_5$ can be used as $M_2B_5$ type compounds.

These metal boride compounds may be used either singly or in suitable combinations. Also, said compound is used in the form of powder and preferably prepared into fine powder with an average particle size of 2 microns or less.

Said molybdenum silicide, titanium carbonitride and metal boride compounds are generally lower in strength at their grain boundaries than in the crystal phase, so that the strength increases as the texture of the sintered body is densified. Therefore, it is theoretically possible to improve the strength by redcing the particle size of said molybdenum silicide, titanium carbonitride and metal boride compounds. Also, since the surface becomes more active, it is possible to improve the sinterability, that is, to lower the sintering temperature. Actually, however, such reduction of particle size makes more serious such problems as oxidation of powder, etc., giving rise to the very difficult problems in treatment of powders.

In the present invention, said molybdenum silicide powder is used as base component and a mixture of said titanium carbonitride and metal boride compound, both prepared into powder, is added thereto in an amount within the range of 1–99% by weight based on said base component.

If the blending ratio of said mixture exceeds the above-defined range, the obtained sintered body proves to be excessively low in strength and it becomes hard to obtain the desired sintered body at an advantageous sintering temperature. The preferred blending ratio is such that the contents of said molybdenum silicide, titanium carbonitride and metal boride compound will be 60% by weight or less, 80% by weight or less and 90% by weight or less, respectively, based on the overall weight of the mixed powder composition.

The ceramic material of this invention can be easily produced according to either of the following two methods.

The first method is a so-called hot press method according to which a mixed powder composition prepared from said materials mixed in said ratio is charged into a suitable mold such as a graphite mold and subjected to heating and sintering in a vacuum or in a neutral or reducing atmosphere such as nitrogen, argon, hydrogen, carbon dioxide or the like under a die pressure of 50–300 kg/cm$^2$ at a temperature of 1,300°–2,000° C., preferably 1,500°–1,800° C., for a period of 10–200 minutes, whereby the desired sintered body can be easily obtained.

In the second method, said mixed powder composition is charged into a mold and subjected to cold compression under a pressure of about 0.5–10 ton/cm$^2$ and the obtained powder compact is rubber pressed in a suitable way, for example, said compact is packed in a rubber tube and then pressed under a hydrostatic pressure of about 0.5–10 ton/cm$^2$ to obtain a powder compact cleared of pressure distribution, or said composition is treated according to a so-called slurry method by reducing the composition into a slurry by using a ball mill and then pressing it by utilizing the pressure difference or other means to obtain a powder compact. The thus obtained powder compact is sintered in vacuo or in a neutral or reducing atmosphere such as nitrogen, argon, hydrogen, carbon dioxide, etc., at a temperature of 1,300°–2,000° C., preferably 1,500°–2,000° C., for a period of 60–200 minutes.

The molybdenum silicide-based ceramic material of this invention has high density and high strength, and in case the content of titanium carbonitride is small, it also has oxidation resistance at high temperatures as a glass phase is formed on the surface portion in the presence of oxygen. Inmate brittleness of molybdenum silicide is also improved. Thus, the novel ceramic material according to this invention can be very advantageously used as high-temperature structural material, material for heaters, wear-resistance machine parts, cutting tools, etc., and also finds its use in many fields of industries.

DESCRIPTION OF EMBODIMENTS

The present invention will be described in further detail below by way of embodiments thereof.

EXAMPLE 1

40 parts by weight of MoSi$_2$ powder, 40 parts by weight of titanium carbonitride powder with a carbon to nitrogen atomic ratio of 50:50 (hereinafter referred to as Ti(C$_{50}$N$_{50}$)), and 20 parts by weight of TiB$_2$ powder were weighed and uniformly mixed to prepare a mixed powder composition. This composition was placed in a mold, compression molded under a pressure of 2 ton/cm$^2$ and further compressed by rubber press under a pressure of 3 ton/cm$^2$. The thus obtained powder compact was heated and sintered in vacuo at 1,650° C. for 90 minutes. The resulting sintered body had a transverse rupture strength of 870 MN/m$^2$ and was free of pore. This example is shown as No. 4 in Table 1. The properties of the sintered bodies obtained in the similar way and the sintering conditions are also shown in Table 1.

EXAMPLE 2

30 parts by weight of MoSi$_2$ and 70 parts by weight of Ti(C$_{50}$N$_{50}$) were uniformly mixed and this mixed powder composition was charged into a graphite mold and sintered in vacuo under a die pressure of 200 kg/cm$^2$ at 1,550° C. for 30 minutes. The obtained sintered body had a transverse rupture strength of 900 MN/m$^2$ and a Vickers hardness of 2,100 kg/mm$^2$ and was poreless. This example is shown as No. 23 in Table 1. No. 26 is the case where NbB$_2$ was used as diboride and the composition was sintered by hot press method as described above.

No. 28 and No. 29 show the comparative examples where MoSi$_2$ alone and Ti(C$_{50}$N$_{50}$) alone were sintered respectively. No sintering takes place with TiB$_2$ alone at about 2,000° C.

No. 30 and No. 31 show the sintering temperatures of a titanium carbonitride-metal boride compound system. It is seen that, in this case, sintering at 1,800° C. is insufficient for obtaining a desired sintered body.

In order to examine the oxidation resistance, an oxidation test was conducted on the sample of No. 27 at 1,000° C. As a result, a glass phase was formed on the surface and the oxidation was checked.

TABLE 1

| No. | Composition (wt %) MoSi$_2$ | Ti (C$_{50}$N$_{50}$) | TiB$_2$ | Sintering conditions Temp. (°C.) | Time (min) | Atmosphere | Transverse rupture strength (MN/m$^2$) | Hardness at room temp. HV (kg/mm$^2$) | Toughness Kic (MPa·ml/2) | Pore |
|---|---|---|---|---|---|---|---|---|---|---|
| 1 | 20 | 80 | 0 | 1650 | 90 | Vacuum | 750 | — | — | Absent |
| 2 | 40 | 60 | 0 | " | " | " | 690 | — | — | " |
| 3 | 20 | 60 | 20 | " | " | " | 850 | — | — | " |
| 4 | 40 | 40 | 20 | " | " | " | 870 | — | — | " |
| 5 | 60 | 20 | 20 | " | " | " | 760 | — | — | " |
| 6 | 80 | 0 | 20 | " | " | " | 690 | — | — | " |
| 7 | 20 | 40 | 40 | " | " | " | 760 | — | — | " |
| 8 | 40 | 20 | 40 | " | " | " | 830 | — | — | " |
| 9 | 60 | 0 | 40 | " | " | " | 690 | — | — | " |
| 10 | 20 | 20 | 60 | " | " | " | 860 | — | — | " |
| 11 | 20 | 80 | 0 | 1750 | " | " | 790 | 2040 | 4.3 | " |
| 12 | 40 | 60 | 0 | " | " | " | 780 | 1920 | 3.7 | " |
| 13 | 60 | 40 | 0 | " | " | " | 700 | 1690 | 4.0 | " |
| 14 | 20 | 60 | 20 | " | " | " | 730 | 2250 | 4.2 | " |
| 15 | 40 | 40 | 20 | " | " | " | 780 | 2150 | 4.7 | " |
| 16 | 60 | 20 | 20 | " | " | " | 810 | 1850 | 2.8 | " |
| 17 | 20 | 40 | 40 | " | " | " | 750 | 2290 | 4.3 | " |
| 18 | 40 | 20 | 40 | " | " | " | — | 2230 | 4.1 | " |
| 19 | 60 | 0 | 40 | " | " | " | — | 2010 | 3.6 | " |
| 20 | 20 | 20 | 60 | " | " | " | 830 | 2330 | 4.0 | " |
| 21 | 40 | 0 | 60 | " | " | " | 870 | 2340 | 3.7 | " |
| 22 | 20 | 0 | 80 | " | " | " | 860 | 2530 | 4.4 | " |
| 23 | 30 | 70 | 0 | 1550 | 30 | Vacuum Die pressure 200 kg/cm$^2$ | 900 | 2100 | — | " |
| 24 | 30 | 0 | 70 | 1650 | 90 | Hydrogen | 700 | — | — | " |

TABLE 1-continued

| | Composition (wt %) | | | Sintering conditions | | | Properties of sintered body | | | |
|---|---|---|---|---|---|---|---|---|---|---|
| No. | MoSi$_2$ | Ti (C$_{50}$N$_{50}$) | TiB$_2$ | Temp. (°C.) | Time (min) | Atmosphere | Transverse rupture strength (MN/m$^2$) | Hardness at room temp. HV (kg/mm$^2$) | Toughness Kic (MPa · ml/2) | Pore |
| 25 | 30 | 0 | 70 | " | " | Ar | 700 | — | — | " |
| 26 | 30 | 0 | NbB$_2$ | 1550 | 60 | Vacuum Die pressure 200 kg/cm$^2$ | 800 | — | — | " |
| 27 | 30 | 0 | 70 | 1700 | 90 | Vacuum | — | — | — | " |
| | | | | | | Comparative examples | | | | |
| 28 | 100 | 0 | 0 | 1600 | 30 | Vacuum Die pressure 200 kg/cm$^2$ | 500 | — | — | Absent |
| 29 | 0 | 100 | 0 | 1700 | 90 | Vacuum | 650 | — | — | " |
| 30 | 0 | 70 | 30 | 2000 | " | " | 700 | 2300 | — | " |
| 31 | 0 | 70 | 30 | 1800 | " | " | 400 | — | — | present scantly |

What is claimed is:

1. A high-strength molybdenum silicide-based ceramic body produced from a powder composition consisting essentially of 20–60% by weight of molybdenum silicide powder as a base component and 80–40% by weight of titanium carbonitride powder with a molar ratio of C:N in solid solution in the range of from 10:90 to 90:10, said powder composition being sintered in a vacuum or in a neutral or reducing atmosphere.

2. A high-strength molybdenum silicide-based ceramic body produced from a powder composition consisting essentially of 20–60% by weight of molybdenum silicide powder as a base component, 60–20% by weight of titanium carbonitride powder with a molar ratio of C:N in solid solution in the range of from 10:90 to 90:10, and about 20% by weight of at least one powdered metal boride compound selected from a group consisting of TiB$_2$, CrB$_2$, TaB$_2$, MnB$_2$, MgB$_2$, MoB$_2$, VB$_2$, NbB$_2$, HfB$_2$, AlB$_2$, W$_2$B$_5$ and Mo$_2$B$_5$, said powder composition being sintered in a vacuum or in a neutral or reducing atmosphere.

3. The high-strength molybdenum silicide-based ceramic body according to claim 1, wherein the powder of each component material has an average particle size of two microns or less.

4. The high-strength molybdenum silicide-based ceramic body according to claim 2, wherein the powder of each component material has an average particle size of two microns or less.

5. The high-strength molybdenum silicide-based ceramic body according to claim 2, wherein the proportions of the powders used is 40% by weight of molybdenum silicide, 40% by weight of titanium carbonitride and 20% by weight of the metal boride.

6. The high-strength molybdenum silicide-based ceramic body according to claim 5, wherein the titanium carbonitride has the formula Ti(C$_{50}$N$_{50}$).

* * * * *